United States Patent [19]

Ketelsen

[11] 4,236,411
[45] Dec. 2, 1980

[54] ELECTROMAGNETIC FLOWMETER

[75] Inventor: Broder Ketelsen, Settmarshausen, Fed. Rep. of Germany

[73] Assignee: Fischer & Porter Co., Warminster, Pa.

[21] Appl. No.: 18,832

[22] Filed: Mar. 8, 1979

[51] Int. Cl.³ .............................................. G01F 1/58
[52] U.S. Cl. .................................................. 73/861.12
[58] Field of Search ................................... 73/194 EM

[56] References Cited

U.S. PATENT DOCUMENTS

| | | | |
|---|---|---|---|
| 3,373,608 | 3/1968 | Ketelsen | 73/194 EM |
| 3,566,687 | 3/1971 | Mittelmann | 73/194 EM |
| 3,589,186 | 6/1971 | Bourg | 73/194 EM |

*Primary Examiner*—Charles A. Ruehl
*Attorney, Agent, or Firm*—Michael Ebert

[57] ABSTRACT

An electromagnetic flowmeter having a flow tube provided with a pair of diametrically-opposed electrodes, the fluid to be metered passing through the tube to intercept a magnetic field thereon, thereby inducing a signal at the electrodes which is a function of flow rate. In this arrangement, X is the axis connecting the electrodes, Z is the axis of the tube and Y is an axis mutually perpendicular to the X and Z axes. In order to minimize the adverse effect of disturbances in flow profile on the flow-induced signal, an electromagnetic field is established by an electromagnet assembly formed by two pairs of electromagnets, each pair being disposed at diametrically-opposed positions on the tube exterior to produce a magnetic field whose lines of flux are substantially parallel to the Y axis, the two paris being symmetrically disposed on either side of the X-Y electrode plane to create a combined magnetic field having a $B_y$ component whose magnitude as represented by a curve whose base line lies parallel to the Z axis, assumes a saddle formation having a trough whose midpoint is substantially coincident with this plane.

6 Claims, 4 Drawing Figures

ELECTROMAGNETIC FLOWMETER

BACKGROUND OF INVENTION

This invention relates generally to electromagnetic flowmeters, and more particularly to a flowmeter of this type which is substantially immune to disturbances in the flow profile of the fluid being metered.

An electromagnetic flowmeter is adapted to measure the flow rates of those fluids which present difficult handling problems, such as corrosive acids, sewage slurries, detergents and the like. In a flowmeter of this type, the liquid whose flow rate is to be measured is conducted through a flow tube whose inner wall is electrically insulated, the tube being provided with a pair of diametrically-opposed electrodes. A magnetic field perpendicular to the longitudinal axis of the tube is established by a pair of oppositely-disposed electromagnets. When the flowing liquid intersects this field, a voltage is induced therein which is transferred to the electrodes. This voltage, which is proportional to the average velocity of the liquid and hence to its average volumetric rate, is then amplified and processed to actuate a recorder or indicator, or to supply an input variable to a process control system.

Since the velocity of the fluid is directed along the longitudinal axis of the flow tube, the voltage induced within the fluid will be perpendicular both to the velocity of this fluid and to the flux lines of the magnetic field. Thus the metered fluid constitutes a series of fluid conductors moving through the magnetic field. The operating principle of a magnetic flowmeter is based upon Faraday's Law of Induction, which states that a voltage induced by any conductor as it moves at right angles through a magnetic field is proportional to the velocity of that conductor. Hence the more rapid the rate of flow, the greater the instantaneous value of the voltage established at the electrodes.

In a flowmeter of this known type, Z is the axis of the flow tube, X is an axis which connects the diametrically-opposed electrodes and Y is an axis mutually perpendicular to the X and Z axis, the lines of magnetic flux established in the region of the electrodes being essentially parallel to the Y axis. In this meter, the $B_y$ component of the magnetic field is essentially homogeneous or non-homogeneous in the X-Y plane at $Z=0$ and is symmetrical to this plane in both Z directions. The $B_y$ component, as one moves from $Z=0$, either first remains at a constant level and then undergoes a continual decline, or it immediately undergoes a continual decline.

With this prior art arrangement, disturbances in the flow profile of the fluid being metered unavoidably have an adverse influence on the induced signal. That is, when the flow profile is non-symmetric about the flow tube axis, or if a swirl component is present in the flow, or if the axi-symmetric profile varies with time, these conditions will affect the flow-induced signal and result in an inaccurate flow reading.

SUMMARY OF INVENTION

In view of the foregoing, the main object of this invention is to provide an electromagnetic flowmeter whose electromagnet assembly is adapted to produce a field which eliminates or minimizes the influence of flow profile disturbances on the induced signal, whereby the signal is significantly less dependent on flow profile than in prior art arrangements.

Briefly stated, in a flowmeter in accordance with the invention, the above object is realized by an electromagnet assembly formed by two pairs of electromagnets, each pair being disposed at diametrically-opposed positions on the flow tube interior to produce a magnetic field whose lines of flux are substantially parallel to a Y axis which is mutually perpendicular to an X axis joining the tube electrodes and a Z axis which coincides with the axis of the tube.

The two pairs of electromagnets are symmetrically disposed on either side of the X-Y electrode plane to create a combined field having a $B_Y$ component whose magnitude as represented by a curve whose base line lies parallel to the Z plane, assumes a saddle formation whose midpoint is substantially coincident with the electrode plane.

OUTLINE OF DRAWINGS

For a better understanding of the invention as well as other objects and further features thereof, reference is made to the following detailed description to be read in conjunction with the accompanying drawings, wherein.

DESCRIPTION OF INVENTION

Figure 1:
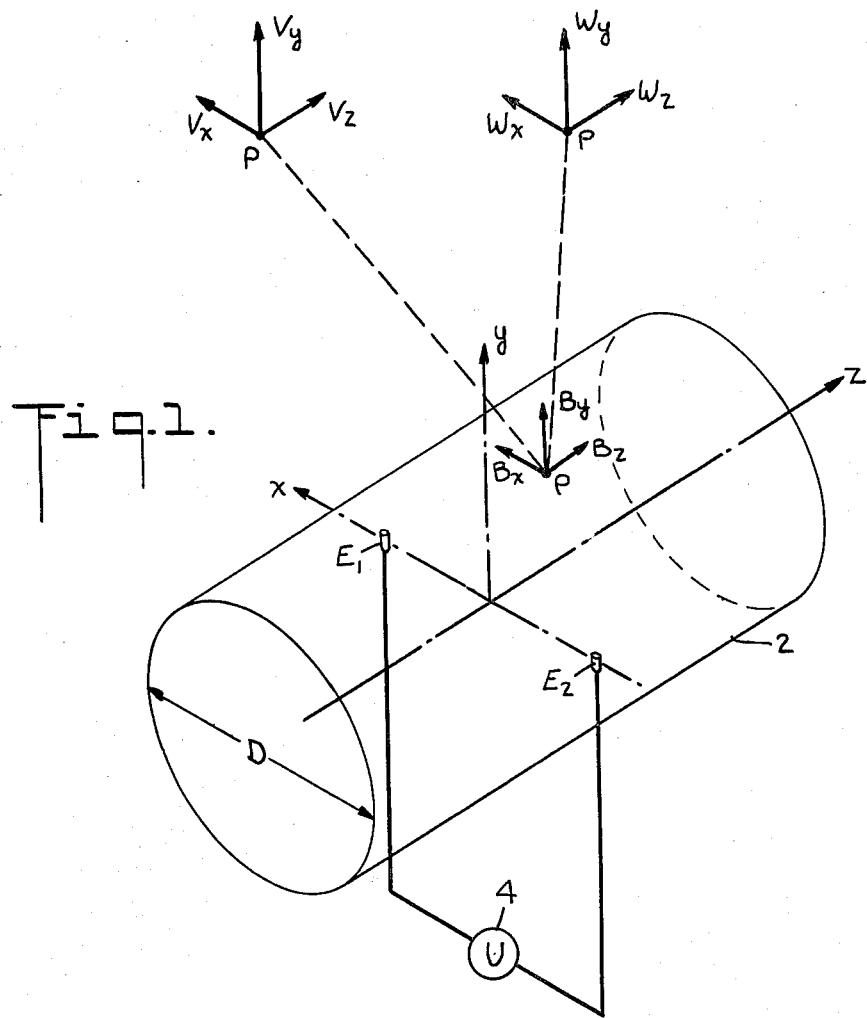
FIG. 1 illustrates schematically the basic arrangement of an electromagnetic flowmeter and defines the coordinate system.

Referring now to FIG. 1, there is shown the flow tube 2 of an electromagnetic flowmeter having a diameter D. Mounted at diametrically-opposed positions on tube 2 are electrodes $E_1$ and $E_2$ which are connected to a voltmeter 4 or any other secondary responsive to the signal induced in the electrodes as a result of the flow of a fluid through the tube which intercepts a magnetic field established therein.

In FIG. 1, axis X corresponds to a line interconnecting electrodes $E_1$ and $E_2$; Z is the longitudinal axis of tube 2; and axis Y is mutually perpendicular to the X and Z axis to complete an orthogonal, right-handed coordinate system.

At every point P within tube 2, three vectors are defined; namely, the velocity $V=(V_x, V_y, V_z)$ of the fluid flowing through point P; the magnetic field $B=(B_x, B_y, B_z)$ which exists at point P; and the weighting factor $W=(W_x, W_y, W_z)$ at point P which is a function of the geometry of the meter.

Figure 2:
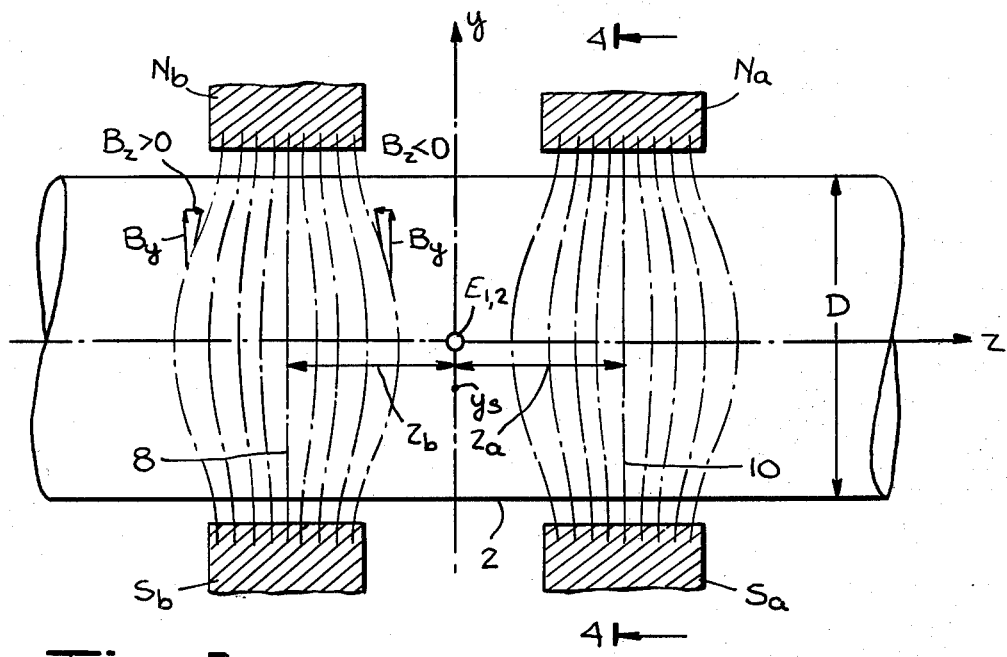
FIG. 2 illustrates schematically a flowmeter having an electromagnet assembly in accordance with the invention.

In the electromagnet assembly shown in FIG. 2, two pairs of electromagnets are provided, one pair represented by pole pieces $N_a$ and $S_a$ being disposed on the exterior of flow tube 2 at diametrically-opposed positions thereon, the other pair represented by pole pieces $N_b$ and $S_b$ also being disposed at diametrically-opposed positions on the exterior of the tube.

The two pairs of electromagnets are symmetrically disposed with respect to the X-Y electrode plane, with their respective center lines 8 and 10 parallel to the Y axis and spaced therefrom by distances $Z_a$ and $Z_b$ which are essentially equal. These distances can be varied in order to adjust the distance of the maximum of the $B_y$ component of the magnetic field from the electrode X-Y plane, at which plane Z=0.

Figure 3:
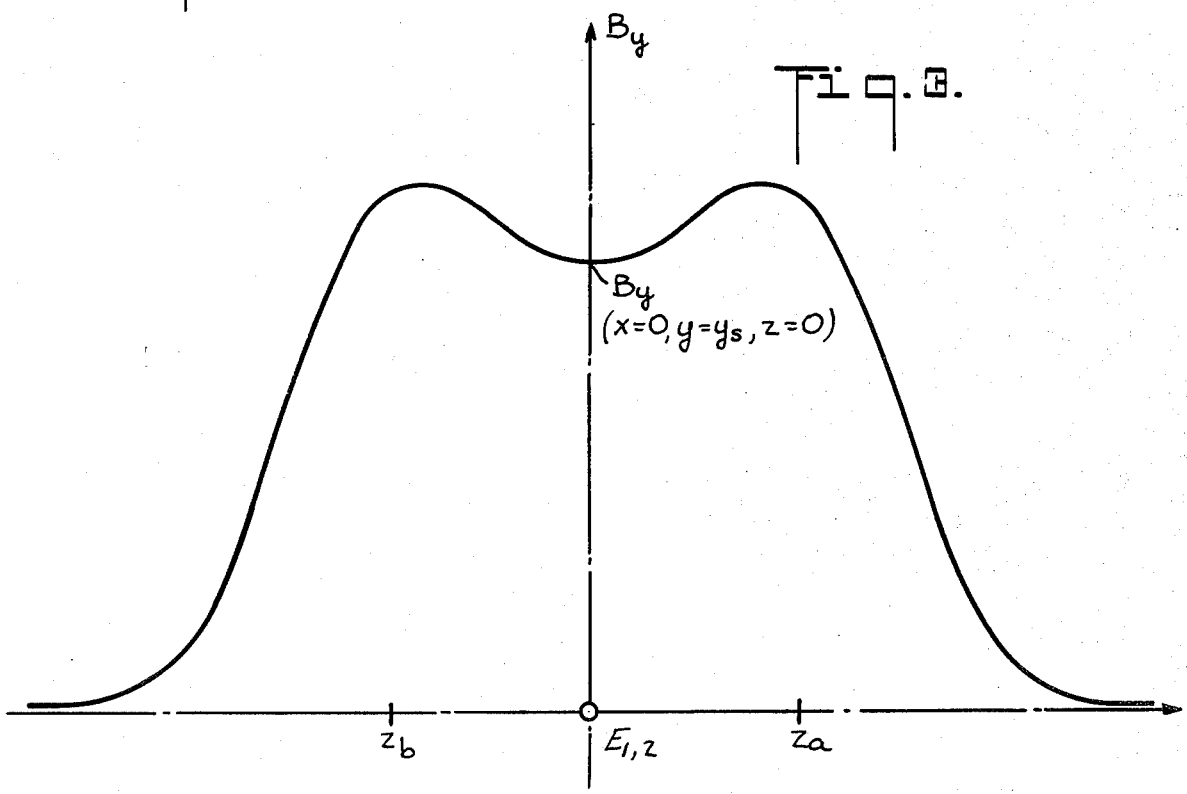
FIG. 3 is a plot of the $B_y$ component of the magnetic flux along a line parallel to the Z-axis through the point $X=0$, $Y=Y_s$.

If a line is drawn parallel to the Z-axis through the point at which X=0, Y=Y$_s$ and Z=0 in the arrangement shown in FIG. 2, then the magnitude of the B$_y$ component along this line is shown in FIG. 3. The resultant curve has a saddle formation, for the B$_y$ component of the magnetic field produced by the two pairs of electromagnets increases in both directions (Z≠0) from the electrode X-Y plane, where Z=0, up to a maximum value at center lines Z$_a$ and Z$_b$ and then steadily decreases.

If, on the other hand, one proceeds in a direction parallel to the X axis (not shown in FIG. 3) from the point at which X=0, Y=Y$_s$ and Z=0, then the magnitude of the B$_y$ component decreases in both directions. At the point X=0, Y=Y$_s$, Z=0, there exists a saddle point of the B$_y$ component within the X-Z plane containing Y=Y$_s$.

Figure 4:
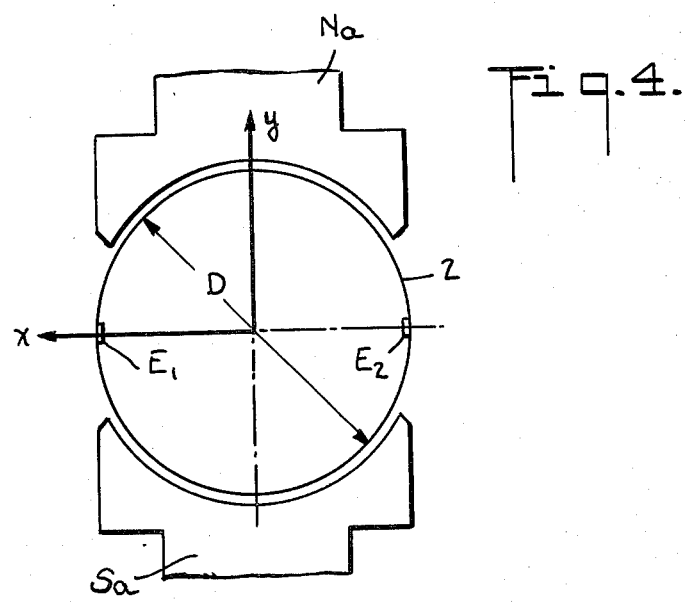
FIG. 4 is a sectional view along the line 4—4 in FIG. 2.

In the electromagnet assembly shown in FIGS. 2 and 4, the pole pieces N$_a$, S$_a$, N$_b$ and S$_b$ are shown as curved to conform to the circumference of cylindrical tube 2, so that the curvature of the pole pieces is concentric to the axis of the tube. While this is desirable, the invention is not limited to this formation.

The significant feature of the present invention, and the reason the flowmeter is substantially immune to disturbances in flow profile is that the electromagnet assembly produces a B$_y$ component of the magnetic field (B$_x$, B$_y$, B$_z$) creating a saddle point (X$_s$, Y$_s$, Z$_s$) in an X-Z plane (Y=Y$_s$) at a distance from the center of the coordinate axes (X=0, Y=0, Z=0), which in the Y direction is less than 0.45 times the tube diameter D (0.45 D) and is preferably less than 0.25 D, and in the X and Z directions is less than 0.1 D, and preferably less than 0.05 D, and in both directions parallel to the X axis (X>X$_s$ and X<X$_s$), the magnitude of the B$_y$ component decreases in a direction toward the inside wall of the tube and increases to a maximum value, after which it decreases in both directions parallel to the Z axis (Z>Z$_s$ and Z<Z$_s$).

The configuration of the magnetic field in accordance with the invention is distinguished from prior art devices by the fact that the magnitude of the B$_y$ component of the magnetic field established by the electromagnet assembly is especially small in the region of the electrodes and increases from this region on both sides in a direction toward the center of the flow tube up to the saddle point and then also increases in both Z directions to a maximum, after which the magnitude decreases.

If one accords primary importance to the influence of the Reynolds number (that is, on the difference between a laminar and turbulent profile) and the influence of a swirl component on the induced signal, then the decrease of the magnitude of the B$_y$ component can be minimal in both X directions. Even if the saddle point is defined to exist in only a single plane, it will be understood because of magnetostatic laws, that corresponding saddle points will exist in other planes parallel to this plane, although their magnitude relationships will be different.

In order to adapt a flowmeter for a wide range of Reynolds numbers and for non-axisymmetric flow profiles, a flowmeter in accordance with the invention is preferably characterized an adjustable distance between the maximums and the electrode plane. The distance between the maximums and the electrode plane shall be between 0.1 D and 0.6 D, preferably between 0.2 D and 0.4 D.

To realize this magnetic field, it is preferred that on both sides of the electrode plane, two pole pieces or coils be located outside of the pipe I.D. which lie opposite to each other and that the center lines which pass through both are essentially parallel to the Y-axis. The influence resulting from the signal which is generated by the magnetic field components (B$_x$, B$_y$, and B$_z$), the weighting factor components (W$_x$, W$_y$ and W$_z$), and the velocity components (V$_x$, V$_y$ and V$_3$) is especially small when using a magnetic field which is in accordance with this invention. Additionally, a favorable relationship exists between the magnitude of the magnetic field strength and the magnitude of the signal at the electrodes. In order to achieve a very pronounced saddle formation around the saddle point, it is preferred that the pole pieces or coils facing the pipe I.D. extend around the circumference of the pipe.

Measurement results which are especially immune to velocity profiles are achieved when the length of the faces of the pole pieces or coils on the pipe outside, measured in the Z-direction, are between 0.15 D and 0.8 D, preferably between 0.2 D and 0.5 D. The angle included by the faces of the pole pieces or coils measured perpendicular to the Z-axis should be between 90° and 150°, preferably between 100° and 130°. For similar reasons, the average diameter of curvature of the faces of the pole pieces or coils lies between 1.0 and 1.6 D, preferably between 1.0 D and 1.3 D.

While there has been shown and described a preferred embodiment of an electromagnetic flowmeter in accordance with the invention, it will be appreciated that many changes and modifications may be made therein without, however, departing from the essential spirit thereof.

I claim:

1. An electromagnetic flowmeter comprising:
   A a flow tube having a pair of diametrically-opposed electrodes mounted thereon, and
   B an electromagnet assembly for establishing a magnetic field in the tube which is intercepted by the fluid to be metered to induce a signal in said electrodes which depends on flow rate, X being the diametrical axis connecting the electrodes, Z being the longitudinal axis of the tube and Y being a transverse axis mutually perpendicular to axes X and Z, said assembly being constituted by two pairs of electromagnets, each pair being disposed at diametrically-opposed positions on the tube exterior to produce a magnetic field whose lines of flux are substantially parallel to the Y-axis, the two pairs being disposed on either side of a plane defined by the X and Y axes to create a combined magnetic field having a magnetic flux component whose magnitude in said plane is relatively weak and increases as one moves in either direction along said Z-axis and then decreases, thereby defining a flux magnitude pattern having a saddle-shaped formation.

2. An electromagnetic flowmeter for measuring the flow rate of a fluid in a manner rendering the meter substantially immune to disturbances in the flow profile of the fluid; said flowmeter comprising:
   A a flow tube through which the fluid to be metered is conducted, said tube having a diameter D, a longitudinal flow axis Z, and a transverse axis Y intersecting axis Z;

B a pair of electrodes mounted at opposed positions on said tube on a diametrical axis X which is mutually perpendicular to said Y and Z axes, the X, Y and Z axes intersecting at a point of origin; and C an electromagnet assembly for generating a magnetic field in the region of the electrodes whose lines of flux are substantially parallel to said Y axis and perpendicular to an X-Z plane which includes the X and Z axes, said magnetic field having a magnetic flux component in the direction of the Y axis which in a curve representing the magnitude of this component with respect to a base line extending along the Z axis has a double-humped saddle-shaped formation whose midpoint trough lies in an electrode plane which includes the X and Y axes, the magnitude of this component increasing in either direction on the Z axis from said point of origin to a maximum value and then decreasing to define the humps of the saddle-shaped formation, the magnitude of this component decreasing in either direction on the X axis from said point of origin.

3. An electromagnetic flowmeter as set forth in claim 2, wherein said electromagnet assembly includes a pair of pole faces located on either side of said electrode plane, the center lines of the pole faces being substantially parallel to the Y axis.

4. An electromagnetic flowmeter as set forth in claim 3, in which the faces of the pole pieces are curved to conform to the circumference of the flow tube.

5. An electromagnetic flowmeter as set forth in claim 4, wherein the pole pieces each have a width dimension in the direction of the Z axis which is between about 0.15 D and 0.8 D.

6. An electromagnetic flowmeter as set forth in claim 5, wherein the faces of the pole pieces have an included angle of between about 90° and 150°.

* * * * *